E. E. CHAPMAN.
SIDE CHAIN SHACKLE FOR AUTOMOBILE WHEELS.
APPLICATION FILED MAR. 2, 1920.
1,418,534. Patented June 6, 1922.
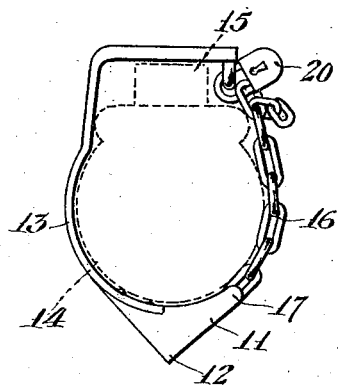
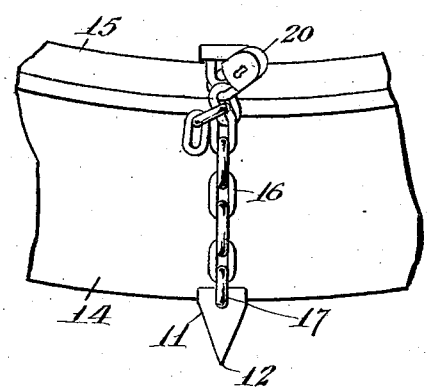
Inventor
Earle E. Chapman
by Graham + Ham
Attorneys.

UNITED STATES PATENT OFFICE.

EARLE E. CHAPMAN, OF LOS ANGELES, CALIFORNIA, ASSIGNOR TO MILLER-CHAPMAN COMPANY, A CORPORATION OF CALIFORNIA.

SIDE CHAIN SHACKLE FOR AUTOMOBILE WHEELS.

1,418,534.

Specification of Letters Patent.   Patented June 6, 1922.

Original application filed March 3, 1917, Serial No. 152,213. Divided and this application filed March 2, 1920. Serial No. 363,086.

*To all whom it may concern:*

Be it known that I, EARLE E. CHAPMAN, a citizen of the United States, residing at Los Angeles, Los Angeles County, and State of California, have invented a new and useful Improvement Comprising the Side Chain Shackles for Automobile Wheels, of which the following is a specification.

My invention relates to shackles which are adapted to be secured about the wheel of an automobile for the purpose of preventing theft or unauthorized use thereof. Such shackles are ordinarily secured about one of the front wheels being locked therearound so that the shackle is difficult to remove and so that they will produce an unmistakable sound and make a plain trail in case the automobile is operated with the shackle in place thereon.

An object of the invention is to provide a shackle for this purpose which will make an unmistakable sound, preventing the automobile from running at a high speed, and which will also leave a distinctive mark on the surface of the street in case the automobile is driven with the shackle in the place on the wheel thereof. For this purpose I provide a bumping member which is secured on the tread of a tire and provided with a sharp projection so placed as to dig into the street if the automobile is moved with the shackle in place.

A further object of my invention is to provide a shackle which will be of very low cost which will be quite efficient in operation.

Further objects and advantages will be made evident hereinafter.

In the drawing which is for illustrative purposes only, Fig. 1 is a section through a tire to which my invention has been applied.

Fig. 2 is a side elevation thereof.

In the form of the invention shown, a bumping block 11 is provided with a pointed projection 12 which is of such size and shape that it will leave a distinctive mark or trail upon the surface of the street in case the automobile is operated with the shackle in place upon one of the wheels.

Secured to the block 11 is an arm 13 which passes inwardly along the side of the tire 14 and over the felly 15 of the wheel. A chain 16 is secured at 17 in the block 11 passing up on the tire and being readily locked to the end of the arm 13 by a padlock 20.

My invention is readily secured about the tire of a wheel and when in place serves to prevent unauthorized movement of the automobile as when the automobile is moved, the bumping member 11 produces an unmistakable noise and movement and the projection 12 leaves a plain mark or trail by which the automobile may be followed.

This application is a division of my application Serial No. 152,213 filed March 3, 1917, and entitled Improvement in vehicle shackles.

I claim as my invention:

1. An auto theft signal for use on a vehicle wheel comprising a bumping block fitting on the tread of a tire carried on said wheel and carrying a projection extending beyond the tread of said tire, said projection being of such size and shape as to permit the wheel to be freely rotated with the signal in place on the wheel, thus raising the wheel from the ground and imparting a marked bumping motion thereto; an arm rigidly fixed to one side of said bumping block and extending inside the felly of said wheel; a flexible member secured at one end to the other side of said bumping block; and a lock securing the free end of said member to said arm.

2. An auto theft signal for use on a vehicle wheel comprising a bumping block fitting on the tread of a tire carried on said wheel and carrying a projection extending beyond the tread of said tire, said projection being of such size and shape as to permit the wheel to be freely rotated with the signal in place on the wheel, thus raising the wheel from the ground and imparting a marked bumping motion thereto, an arm rigidly fixed to one side of said bumping block and extending inside the felly of said wheel; a chain member secured at one end to the other side of said bumping block; and a lock securing the free end of said member to said arm.

In testimony whereof, I have hereunto set my hand at Los Angeles, California, this 25th day of February 1920.

EARLE E. CHAPMAN.